(12) United States Patent
Graves et al.

(10) Patent No.: US 9,879,658 B2
(45) Date of Patent: Jan. 30, 2018

(54) THERMOSTATIC VALVE WITH ANTI-FAILURE PROVISIONS

(71) Applicant: Acorn Engineering Company, City of Industry, CA (US)

(72) Inventors: James C Graves, Lake Forest, IL (US); Dejan Zivancevic, Arlington Heights, IL (US)

(73) Assignee: Acorn Engineering Company, City of Industry, CA (US)

( * ) Notice: Subject to any disclaimer, the term of this patent is extended or adjusted under 35 U.S.C. 154(b) by 748 days.

(21) Appl. No.: 13/987,411

(22) Filed: Jul. 23, 2013

(65) Prior Publication Data

US 2015/0027551 A1  Jan. 29, 2015

(51) Int. Cl.
| | |
|---|---|
| *G05D 23/13* | (2006.01) |
| *G05D 23/185* | (2006.01) |
| *G05D 23/12* | (2006.01) |
| *F03G 7/06* | (2006.01) |
| *F16K 11/00* | (2006.01) |
| *A61H 35/02* | (2006.01) |
| *A61H 33/00* | (2006.01) |
| *G05D 23/02* | (2006.01) |
| *E03B 7/04* | (2006.01) |

(52) U.S. Cl.
CPC ......... *F03G 7/065* (2013.01); *A61H 33/0095* (2013.01); *A61H 35/02* (2013.01); *F16K 19/006* (2013.01); *G05D 23/1333* (2013.01); *E03B 7/045* (2013.01); *G05D 23/021* (2013.01); *G05D 23/13* (2013.01); *G05D 23/132* (2013.01); *G05D 23/1306* (2013.01); *G05D 23/136* (2013.01); *G05D 23/1852* (2013.01); *G05D 23/1858* (2013.01); *Y10T 137/0324* (2015.04)

(58) Field of Classification Search
CPC .. G05D 23/00; G05D 23/185; G05D 23/1852; G05D 23/1856; G05D 23/021; G05D 23/1858; G05D 23/13; G05D 23/1306; G05D 23/132; G05D 23/136; E03B 7/045
USPC ......... 236/12.11, 12.13, 12.16, 12.17, 12.18; 137/337
See application file for complete search history.

(56) References Cited

U.S. PATENT DOCUMENTS

| | | |
|---|---|---|
| 2,932,453 A | 4/1960 | Dillman |
| 3,805,836 A | 4/1974 | Veale |
| | (Continued) | |

OTHER PUBLICATIONS

ASSE Standard #1071-2008, American Society of Sanitary Engineering, Performance Requirements for Temperature Actuated Mixing-Valves for Plumbed Emergency Equipment. Jan. 14, 2008.
(Continued)

*Primary Examiner* — Frantz Jules
*Assistant Examiner* — Daniel C Comings
(74) *Attorney, Agent, or Firm* — Eric J. Sosenko; Jonathan P. O'Brien; Honigman Miller Schwartz and Cohn LLP

(57) ABSTRACT

Embodiments include eyewash valves in which the temperature of the water emerging from the valve is thermostatically controlled by a wax motor which regulates the flow of hot and cold water through the valve. Embodiments include provisions for continuing water flow through the valve despite failure of the hot water supply. Embodiments also include provisions for water flow through the valve despite failure of the wax motor in the upper position or in the lower position.

6 Claims, 6 Drawing Sheets

(56) References Cited

U.S. PATENT DOCUMENTS

| | | | | |
|---|---|---|---|---|
| 5,647,531 | A * | 7/1997 | Kline | G05D 23/1346 |
| | | | | 236/12.14 |
| 6,315,209 | B1 | 11/2001 | Tripp | |
| 6,378,776 | B1 * | 4/2002 | Chamot | G05D 23/021 |
| | | | | 236/100 |
| 6,695,217 | B2 | 2/2004 | Leu et al. | |
| 7,744,007 | B2 | 6/2010 | Beagen et al. | |
| 8,066,197 | B2 | 11/2011 | Sheppard | |
| 8,176,937 | B2 * | 5/2012 | Zhang | F16K 11/074 |
| | | | | 137/337 |
| 2004/0046037 | A1 * | 3/2004 | Swadling | G05D 23/1353 |
| | | | | 236/12.11 |
| 2006/0231637 | A1 * | 10/2006 | Schmitt | B01F 5/0268 |
| | | | | 236/12.11 |
| 2010/0147963 | A1 * | 6/2010 | Goncze | G05D 23/1353 |
| | | | | 236/12.16 |
| 2013/0075485 | A1 * | 3/2013 | Hong | F03G 7/06 |
| | | | | 236/93 R |

OTHER PUBLICATIONS

ANSI/ISEA Z358. Jan. 2009, International Safety Equipment Association. American National Standard for Emergency Eyewash and Shower Equipment. Sep. 29, 2009.

* cited by examiner

100 # THERMOSTATIC VALVE WITH ANTI-FAILURE PROVISIONS

BACKGROUND OF THE INVENTION

Field of the Invention

Embodiments relate to thermostatic valves involving the mixing of fluids of dissimilar temperature in which supplies of fluids are controlled according to the temperature and pressure of the mixed fluids by a reciprocating valve.

Thermostatic valves are used to control the temperature of water supplied to emergency eyewash/showers equipment. Temperature control for such equipment is important because exposure to excessively hot water might exacerbate injury from contact with harmful chemicals, while use of excessively cold water may cause such discomfort to the victim as to limit use of the emergency equipment to less than the recommended duration of 15 minutes. The recommended temperature is described as "tepid" defined as 60° to 100° F. Such valves function by using a temperature sensitive regulator, often a wax motor, to regulate the relative volumes of hot and cold water supplied to the emergency equipment.

Since eyewash showers are used primarily to rinse the eyes and body after contact with a harmful chemical, it is important that they function reliably. Embodiments of the present disclosure provide cold water to the emergency equipment in the case of failure of the hot water supply. In addition, embodiments provide cold water to the eyewash shower in the case of the two failure modes of the wax motor.

The foregoing examples of the related art and limitations related therewith are intended to be illustrative and not exclusive. Other limitations of the related art will become apparent to those of skill in the art upon a reading of the specification and a study of the drawings.

BRIEF SUMMARY OF THE INVENTION

The following embodiments and aspects thereof are described and illustrated in conjunction with systems, tool and methods which are meant to be exemplary and illustrative, not limiting in scope. In various embodiments, one or more of the above-described problems have been reduced or eliminated, while other embodiments are directed to other improvements.

Embodiments include a thermostatic emergency eyewash and shower valve in which hot and cold water is mixed which comprise a hot water path from the hot water supply which allows flow of hot water through a hot water conduit into a port into a mixing chamber, the flow of hot water through a hot water port controlled by a wax motor by means of a shuttle. There is a primary cold water path from a manifold attached to the cold water supply, the flow passing through a check valve which allows flow of cold through a primary cold water conduit, the flow of cold water through a primary cold water port into a mixing chamber, the flow of cold water through the primary cold water port controlled by the thermostatic controller by means of the shuttle, the shuttle capable of closing either but not both the hot water port and the primary cold water port. There is a secondary cold water path from the manifold attached to the cold water supply, the flow passing through a bypass valve which allows flow of cold water through the hot water path, the flow of cold water into the hot water conduit and through the hot water port into a mixing chamber.

Embodiments include a thermostatic emergency eyewash and shower valve in which hot and cold water is mixed which provides water flow despite failure of the hot water supply or failure of a wax motor which comprises a body, the body having a hot water path, a primary cold water path, a secondary cold water path, a central chamber containing a wax motor, a shuttle, a mixing chamber and a mixed water outlet.

Also included is the hot water path comprising a hot water supply, a hot water conduit leading to a circular hot water port, wherein hot water passes from the hot water supply, through the hot water valve, through the hot water conduit, through the hot water port, and into the central chamber. Also included is the primary cold water path comprising a cold water supply, a cold water manifold, a cold water bypass valve, a primary cold water conduit leading to a circular primary cold water port, wherein cold water passes from the cold water supply into the cold water manifold, through the primary cold water valve, into the primary cold water conduit and from the primary cold water conduit through the primary cold water port into the mixing chamber and out the mixed water outlet. Also included is the secondary cold water path comprising the cold water supply and manifold of the primary cold water path, a secondary cold water bypass check valve which allows the passage of cold water at a pressure drop higher than the pressure drop which allows water to pass through the primary cold water valve, the secondary cold water conduit connected to the hot water conduit, wherein cold water passes through the cold water supply and manifold of the primary cold water path, through the secondary cold water valve into the secondary cold water conduit, into the hot water conduit, and through the hot water port into the mixing chamber, and out the mixed water outlet. Also included is the thermostatic controller attached to a cylindrical shuttle, the shuttle capable of reciprocating motion within the central chamber, the shuttle having a cold water lip on its upper edge, the cold water lip capable of controlling flow through the primary cold water port into the mixing chamber, the shuttle having a hot water lip on its lower edge, the hot water lip capable of controlling flow through the hot water port into the mixing chamber.

In addition to the exemplary aspects and embodiments described above, further aspects and embodiments will become apparent by reference to the drawings and by study of the following descriptions.

BRIEF DESCRIPTION OF THE SEVERAL VIEWS OF THE DRAWING(S)

DETAILED DESCRIPTION OF THE INVENTION

Figure 1:
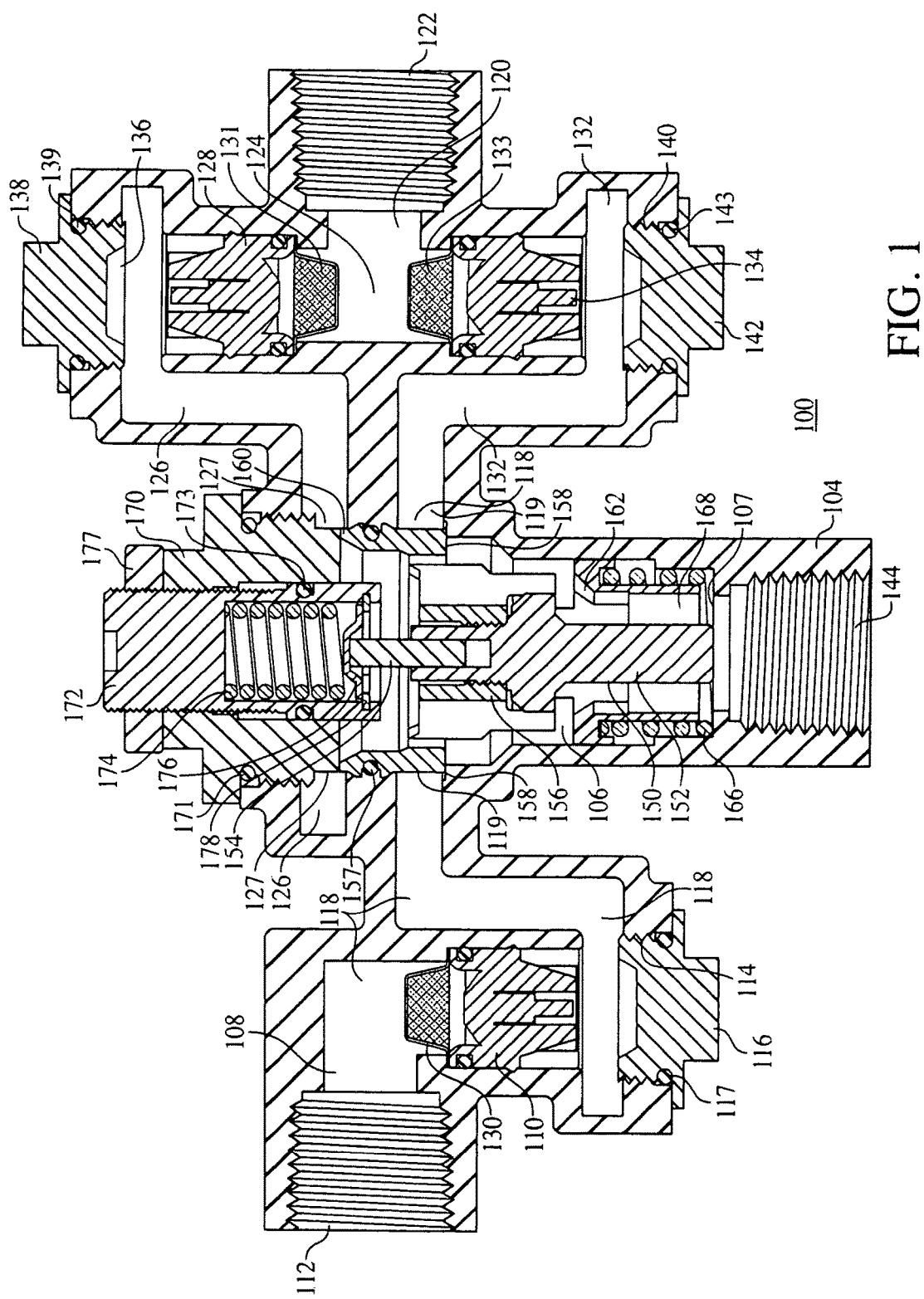
FIG. 1 shows a cross-sectional view of an embodiment valve.

FIG. 1 shows a cross-sectional view of an embodiment eyewash valve 100. visible in FIG. 1 is the valve body 104, with a hollow cylindrical central chamber 106, and a mixed water outlet 144 which leads to the eyewash shower.

A hot water path 108 comprises a hot water inlet 112, which is attached to a source of hot water, not shown in FIG. 1, a hot water check valve 110 with attached hot water filter screen 130, hot water access port 114, which is closed by hot water access plug 116 and hot water conduit 118 through which hot water flows. A plug O-ring seals the joint between port and plug. The hot water check valve 110, hot water filter screen 130, hot water access port 114 and plug O-ring are optional. The hot water conduit 118 is terminated at the circular hot water port 119 located on the circumference of the cylindrical central chamber 106.

A cold water path 120 comprises a cold water inlet 122, which is attached to a source of cold water, not shown in FIG. 1, cold water manifold 124, attached to the cold water manifold 124 is the cold water check valve 128 with attached cold water filter screen 131, which feeds the primary cold water conduit 126. A primary cold water conduit access port 136 is normally closed by primary cold water conduit access plug 138. A plug O-ring 139 seals the joint between port and plug. The primary cold water conduit 126 is terminated at the circular primary cold water port 127 located on the circumference of the cylindrical central chamber 106 above the hot water port 119.

Also attached to the cold water manifold 124 is the secondary cold water conduit bypass valve 134 with attached secondary cold water filter screen 133 which feeds the secondary cold water conduit 132 with attached secondary cold water conduit access port 140 which is normally closed by secondary cold water conduit access plug 142. A plug O-ring 143 seals the joint between port and plug.

The secondary cold water conduit 132 communicates with the hot water conduit 118 at the hot water port 119. The hot water port 119 thus serves to provide hot water to the mixing chamber 168 when water flow is through the hot water conduit 118, and provides cold water to the mixing chamber 168 when there is flow through the secondary cold water conduit 132.

In embodiments, the cold water check valve 128, hot water check valve 110, and the bypass valve 134 allow passage of water at their rated pressure only when exposed to water at a pressure greater than their rated pressure. In embodiments the pressure of the hot and cold water supply is 60 pounds per square inch (psi). The optional hot water check valve 110 will pass water from the hot water inlet 112 into the hot water conduit 118 at a pressure drop of 3 psi. The primary cold water check valve 128 will pass water from the cold water manifold 125 into the primary cold water conduit 126 at a pressure drop of 3 psi.

When flow rates are low (low pressure drops of say 3 psi) the bypass valve remains closed allowing precise control of the temperature of the water coming out of the valve. Without a pressure sensitive bypass valve, the temperature at low flow rates would be reduced or affected greatly by the leakage of cold water into the hot water port.

Embodiment thermostatic valves are controlled by a wax motor 150 comprised of a stem 154 attached to and extending from the wax motor body 152. The wax motor 150 is attached to a cylindrical shuttle 156 with a cold water lip 160 at the circumference at the top of the shuttle 156 and a hot water lip 158 at a circumference below the cold water lip. A shuttle O-ring 157 prevents passage of water between the primary cold water conduit 126 and the hot water conduit 118. The cold water lip 160 opens and closes the primary cold water port 127. The hot water lip 158 opens and closes the hot water port 119. Water flows from the hot and cold water ports into and through the mixing chamber 168 and over the wax motor 150. The shuttle 156 moves up and down in the central chamber 106 due to the expansion and contraction of the wax motor 150, which occurs in response to the temperature of the water entering the mixing chamber 168. The shuttle 154 is capable of completely closing only one but not both hot water port 119 and primary cold water port 127 at a time.

A lower spring 166 rests on a shoulder 107 at the bottom of the central chamber 106. A generally cylindrical wax motor funnel 162 is urged upward by the lower spring 166. The generally cylindrical wax motor funnel 164 supports the wax motor 150.

At the top of the valve, a bonnet 170 closes the top of the central chamber 106. An O-ring 171 seals the joint between bonnet and central chamber 106. The temperature adjustment stem 172 is threaded into the bonnet. A stem O-ring 173 seals the joint between stem and bonnet. An upper spring 174 is contained in a cavity in the stem 172 and bears downward on the cap 176 which is held in the cavity by a cap retainer ring 178. The cap 172 bears on the wax motor stem 154.

Rotation of the temperature adjustment stem 172 results in the translational movement of the wax motor and predetermines the temperature of the mixed water passing through the valve.

Figure 2:
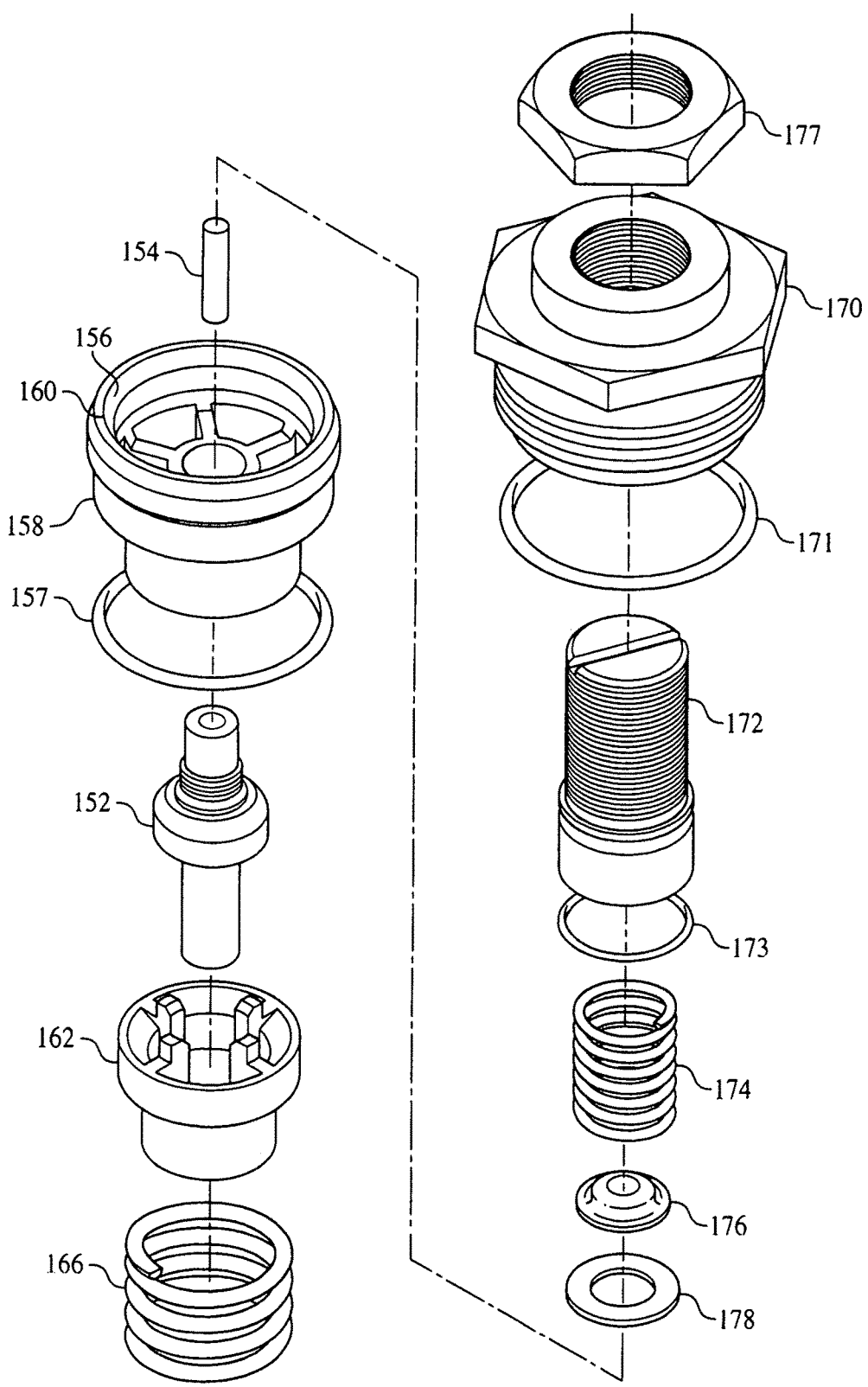
FIG. 2 is an expanded view of the temperature control elements from the central chamber of an embodiment valve.

FIG. 2 is an expanded view of the temperature control elements from the central chamber of an embodiment valve. Visible in FIG. 2 is the lower spring 166 and wax motor funnel 162. The shuttle 156 includes the cold water lip 160, hot water lip 158 and shuttle O-ring 157. Also visible in FIG. 2 is the wax motor body 152, wax motor stem 154, cap retainer ring 178, cap 176, and upper spring 174. Also shown is the temperature adjustment stem 172 with stem O-ring 173 and the bonnet 170 with attached bonnet O-ring 171.

Figure 3:
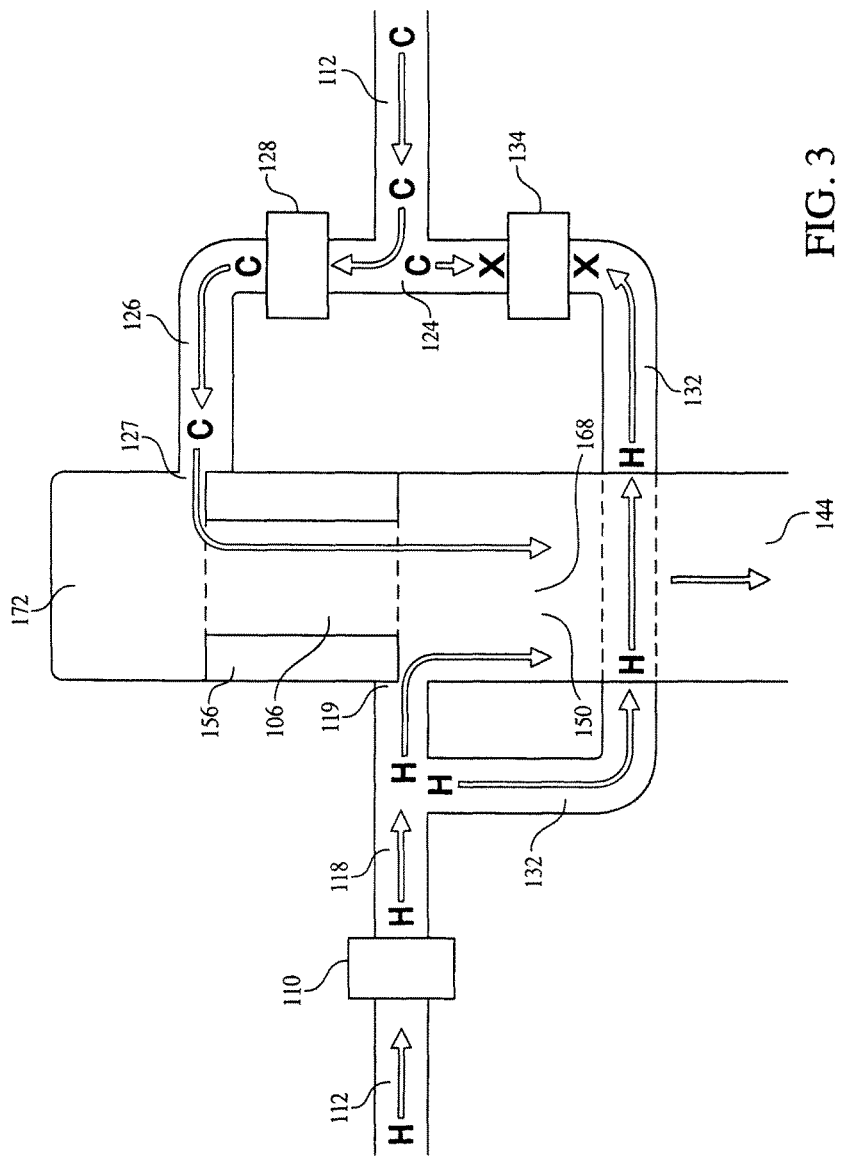
FIG. 3 is a diagrammatic illustration of the fluid flow during normal operation of an embodiment valve.

FIG. 3 is a diagrammatic illustration of the fluid flow during normal operation of an embodiment thermostatic valve. FIG. 3 shows the hot water inlet 112, hot water check valve 110, hot water conduit 118, how water port 119, central chamber 106, shuttle 156, mixing chamber 168, and mixed water outlet 144. Also visible in FIG. 3 is the cold water inlet 112, cold water manifold 124, check valve 128, primary cold water conduit 126, primary cold water port 127, bypass valve 134, and secondary cold water conduit 132. Note the passage of the secondary cold water conduit 132 behind the central chamber 106 is indicated by dashed lines. Also, note the connection of the secondary cold water conduit 132 with the hot water conduit 118. Arrows H and C indicate the flow of hot and cold water, respectively. An X at the end of an arrow indicates blocked flow. While the temperature adjustment stem and wax motor are not shown on FIG. 3, their locations in the central chamber 106 are shown at 172 and 150, respectively.

FIG. 3 shows the normal operation of embodiments. The desired temperature of the mixed water is pre-adjusted using the temperature adjustment stem at 172. The wax motor at 150 reacts to the temperature of the water flowing past it. If the water in the mixing chamber 168 is colder than the pre-set temperature, the contraction of the wax motor allows the lower spring to push the shuttle 156 up toward the cold water seat, thereby proportionally closing the primary cold water port 127 and proportionally opening the hot water port 119. If the water is hotter than the pre-set temperature, the expansion of the wax motor pushes the shuttle 156 down toward the hot water seat with compression of the lower spring, thereby proportionally opening the primary cold water port 127 and proportionally closing the hot water port 119. When the shuttle position resulting in a mixed water outlet flow of temperature equal to that of the pre-set temperature the shuttle perpetually controls hot and cold water flow into the mixing chamber 168 and out the mixed water outlet 144. Of course, the shuttle position may vary according to the temperature and or pressure of the hot and cold water entering the thermostatic valve.

There is no flow through the cold water bypass valve 134 so long as the pressure differential between the cold water manifold 124 and the secondary cold water conduit 132 is maintained at a relatively low level through flow through the cold water check valve 128. In embodiments, the bypass valve 134 opens at a pressure differential of 10 psi.

Thermostatic Valve Operation During Failure Modes

Cold Water Failure. Failure of the cold water supply is sensed by the wax motor and the hot water flow is terminated, avoiding a potentially dangerous condition.

If the cold water supply is lost or fails, the wax motor senses the loss of cold water by an increasing temperature in the mixing chamber and the outlet water. This increase in temperature causes the motor stem to push the shuttle against the lower spring thereby stopping the hot water flow. This prevents passage of excessively hot and potentially dangerous water through the thermostatic valve.

Hot Water Failure. If the hot water supply is lost or fails, the wax motor senses this by a decreasing mixing chamber and outlet water temperature. This decrease in temperature causes the wax motor stem to reduce it's length and allows the lower spring to force the shuttle upward thereby closing the primary cold water port. As the primary cold water conduit is closed, the pressure drop across the bypass valve increases to a point where the bypass valve opens and allows cold water flow through the hot water port and through the mixing chamber and out of the thermostatic valve.

Figure 4:
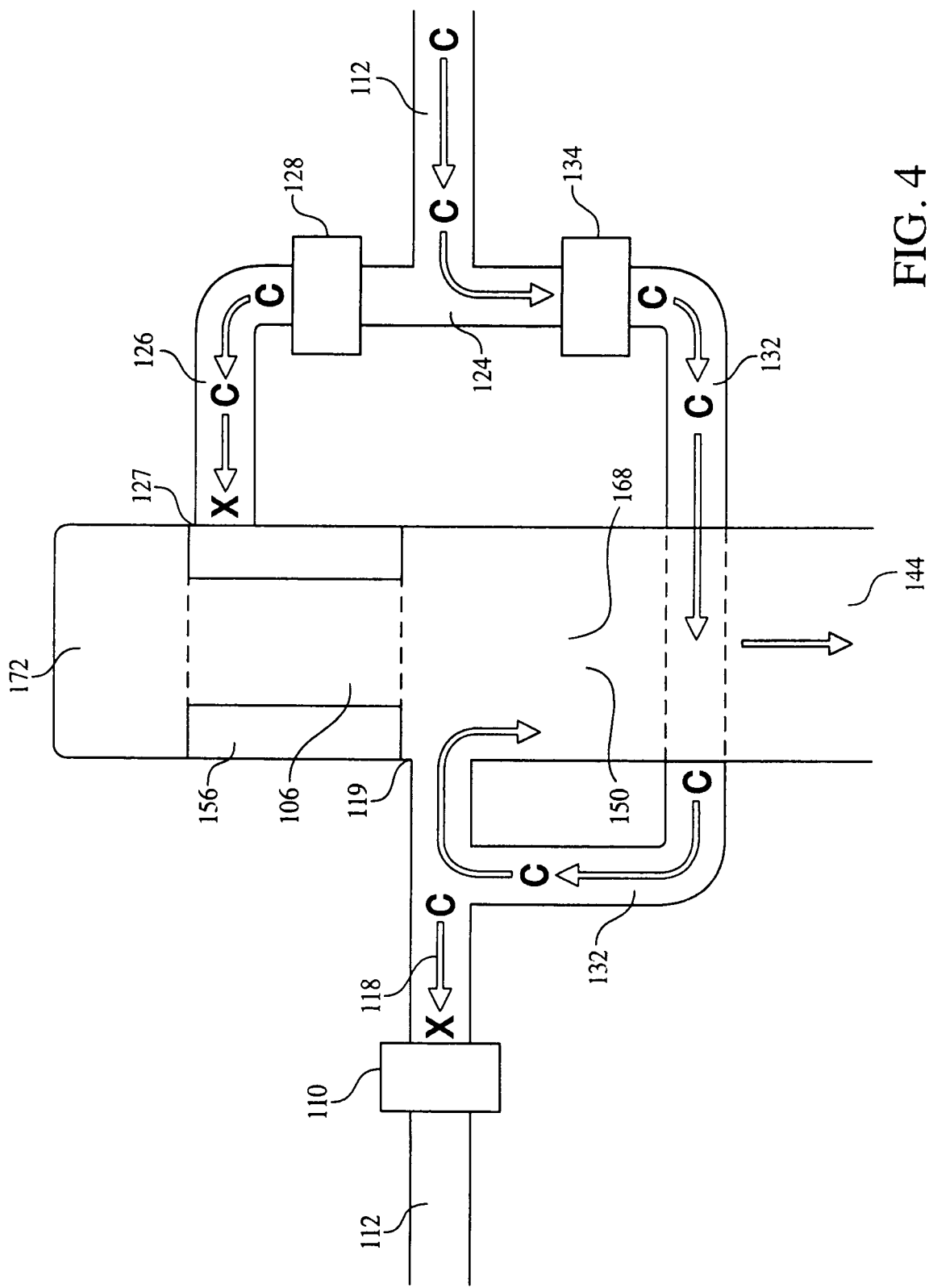
FIG. 4 is a diagrammatic illustration of the fluid flow during operation of an embodiment valve after failure of the hot water supply.

FIG. 4 is a diagrammatic illustration of the fluid flow during operation of an embodiment valve after failure of the hot water supply. The elements in FIG. 4 are the same as those in FIG. 3 except that the flow of water from the hot water inlet 112 has ceased.

In FIG. 4 the failure of the hot water supply has caused the water in the mixing chamber 168 to become colder than the pre-set temperature. The wax motor at 150 has contracted, thereby closing the cold water port 127 and opening the hot water port 119, although no hot water reaches the mixing chamber 168 because of the failure of the hot water supply 112. Since the flow through the cold water port 127 has been blocked by the shuttle 156, the pressure differential between the cold water manifold 124 and the secondary cold water conduit 132 grows until cold water begins to flow through the bypass valve 134 into the secondary cold water conduit 132. The cold water flows into the hot water conduit 118. Flow toward the hot water supply 112 is blocked by hot water check valve 110. The cold water then flows through the hot water port 119 into the mixing chamber 168 and out the mixed water outlet 144, thereby providing a source of water to the eyewash shower despite the loss of a hot water supply.

Motor or Shuttle Failure Closing Cold Water Port. In this failure mode the pressure in the primary cold water conduit is raised until cold water flow through the bypass valve allows cold water to enter the hot water conduit. If steps have been taken to assure a higher cold water pressure than hot water pressure, the cold water then enters the hot water conduit and blocks flow of hot water through that conduit. Only cold water then enters the mixing chamber and the thermostatic valve outlet.

Figure 5:
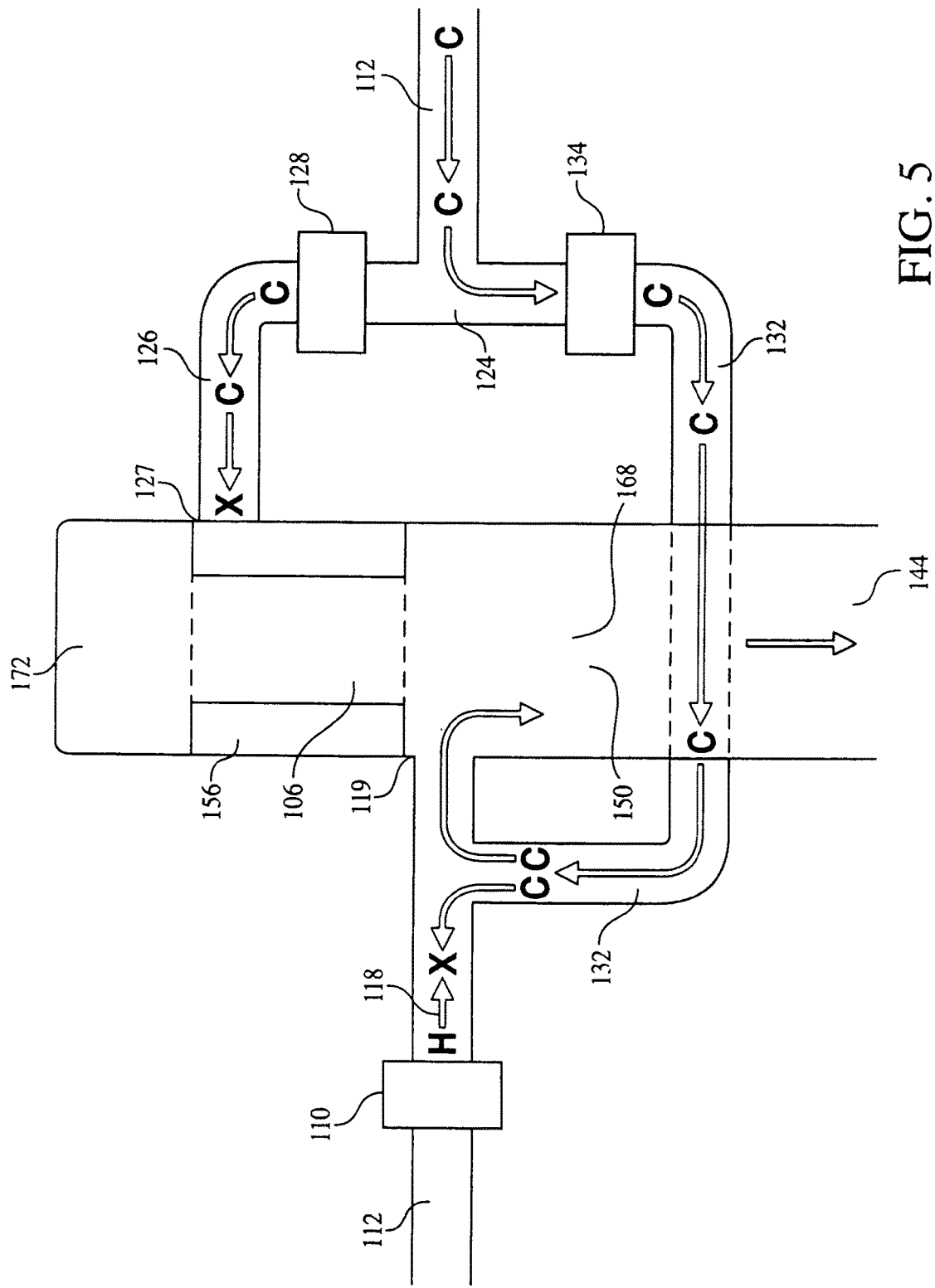
FIG. 5 is a diagrammatic illustration of the fluid flow during operation of an embodiment valve after wax motor failure in which the shuttle is fixed in the upper position.

FIG. 5 is a diagrammatic illustration of the fluid flow during operation of an embodiment valve after wax motor failure or shuttle malfunction in which the shuttle is fixed in the upper position. Such wax motor failure could occur through fracture or displacement of the wax motor stem 154 or fracture of the wax motor body 152. These are the typical failure modes of a wax motor. In addition, any malfunction in which the shuttle sticks in position blocking the cold water port is included in this failure mode.

In FIG. 5 displacement of the shuttle 156 in the upper position causes flow through the secondary cold water conduit 132 as in FIG. 4. Flow of hot water is blocked by the cold water flow through the secondary cold water conduit 132 because the water in that conduit, having passed through the bypass valve 134, is at a higher pressure than the hot water which has passed through the check valve 110. The cold water then flows through the hot water port 119 into the mixing chamber 168 and out the mixed water outlet 144, thereby providing a source of water to the eyewash shower despite the displacement of the shuttle 156 in the upper position.

Operation in the failure mode shown in FIG. 5 requires that the cold water pressure be higher than the hot water pressure. This pressure differential is the usual condition, because the cold water supply is usually diverted through a water heater, which causes a small loss of pressure in the resultant hot water, as compared to the cold water pressure. In order to assure the pressure differential, a pressure reducing valve, along with a pressure indicating gauge, may optionally be installed in the hot water supply line.

Motor or Shuttle Failure Closing Hot Water Port. In this failure mode the hot water supply is blocked. This condition allows unrestricted flow of cold water through the thermostatic valve.

Figure 6:
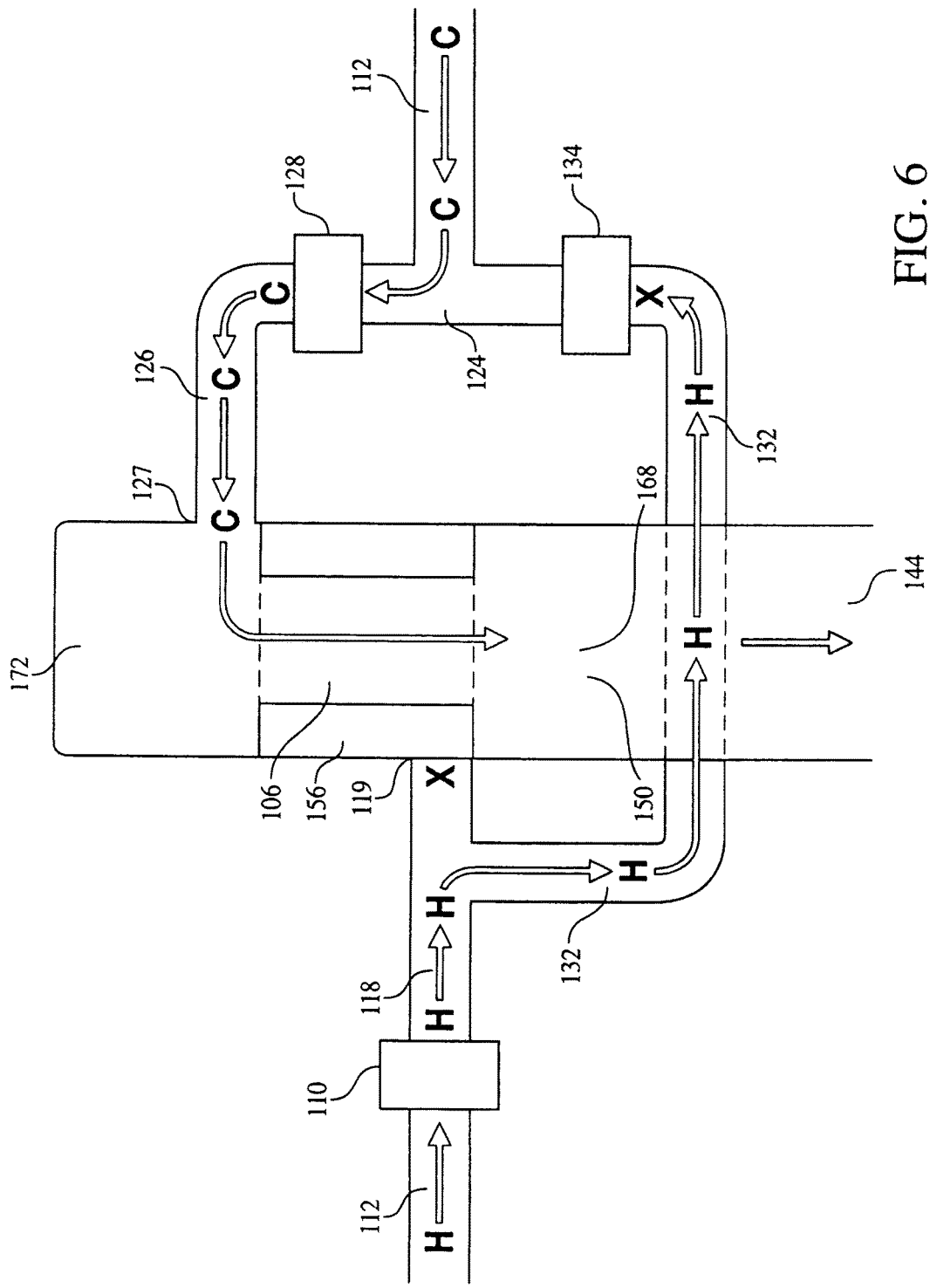
FIG. 6 is a diagrammatic illustration of the fluid flow during operation of an embodiment valve after wax motor failure in which the shuttle is fixed in the lower position.

FIG. 6 is a diagrammatic illustration of the fluid flow during operation of an embodiment thermostatic valve after wax motor failure in which the shuttle is fixed in the lower position. Such wax motor failure could occur through fracture or displacement of the wax motor stem 154 or fracture of the wax motor body 152. In addition, any malfunction in which the shuttle sticks in position blocking the cold water port is included in this failure mode.

In FIG. 6 the displacement of the shuttle 156 in the lower position causes the opening of the primary cold water port 127 and closure of the hot water port 119 with respect to flow into the mixing chamber 168. Cold water is free to flow through the primary cold water port 127 into the mixing chamber 168 and out the mixed water outlet 144. Hot water is free to flow through the hot water check valve 110 but is blocked by the shuttle 156 from entering the mixing chamber 168, and is blocked by the bypass valve from entering the manifold 124.

Embodiments therefore can maintain the flow of cold water through the thermostatic valve for emergency use despite failure of the hot water supply or failure of the wax motor or shuttle to operate properly resulting in closure of the hot water port.

Embodiments therefore shut off the flow of hot water through the thermostatic valve in case of failure of the cold water supply or failure of the wax motor or shuttle to operate properly resulting in closure of the cold water port.

Embodiments are manufactured of suitable hard, non-porous, strong materials such as bronze, steel, stainless steel, and iron.

Embodiment wax motors are formed of a temperature responsive material such as paraffin wax of known temperature responsive properties. The wax is enclosed in a suitable flexible membrane such as a fluoroelastomer film.

While a number of exemplary aspects and embodiments have been discussed above, those of skill in the art will recognize certain modifications, permutations, additions and sub combinations thereof. It is therefore intended that the following appended claims and claims hereafter introduced are interpreted to include all such modifications, permutations, additions and sub-combinations as are within their true spirit and scope. The applicant or applicants have attempted to disclose all the embodiments of the invention that could be reasonably foreseen. There may be unforeseeable insubstantial modifications that remain as equivalents.

We claim:

1. A thermostatic emergency eyewash and shower valve in which hot and cold water is mixed comprising:
    a hot water path being defined through a hot water conduit with a check valve and thereafter through a hot water port and terminating into a mixing chamber, flow of hot water through the hot water port controlled by a wax motor coupled to a shuttle,
    a primary cold water path from a manifold, flow of cold water passing through a check valve which allows flow of cold water through a primary cold water conduit and thereafter through a primary cold water port terminating into the mixing chamber, the flow of cold water through the primary cold water port controlled by a thermostatic controller by means of the shuttle, the shuttle capable of closing either the hot water port or the primary cold water port but not both at the same time, and
    a secondary cold water path from the manifold, the secondary cold water path defined by and providing a flow passing through a pressure-sensitive bypass valve which allows the flow of cold water into the hot water path, the flow of cold water through the hot water path being into the hot water conduit and through the hot water port and terminating into the mixing chamber.

2. The thermostatic emergency eyewash and shower valve of claim 1 further comprising a pressure reducing valve in the hot water supply.

3. A thermostatic emergency eyewash and shower valve in which hot and cold water are mixed and which provides water flow despite failure of a hot or cold water supply or failure of a wax motor or malfunction of a shuttle closing a hot or cold water port comprising:
    a body, the body having a hot water path with a check valve, a primary cold water path, a secondary cold water path, a central chamber containing a wax motor, a shuttle, a mixing chamber and a mixed water outlet,
    the hot water path comprising a hot water supply, a hot water conduit leading to a hot water port terminating at the central chamber, wherein hot water passes from the hot water supply, through the hot water conduit, through the hot water port, and into the central chamber,
    the primary cold water path comprising a cold water supply, a cold water manifold, a cold water pressure-sensitive bypass valve, a primary cold water conduit leading to a primary cold water port,
    wherein cold water passes from the cold water supply into the cold water manifold, through the primary cold water valve, into the primary cold water conduit and from the primary cold water conduit through the primary cold water port into the mixing chamber and out the mixed water outlet,
    the secondary cold water path comprising the cold water supply, the manifold of the primary cold water path, a secondary cold water bypass valve which allows the passage of cold water at a pressure higher than the pressure which allows water to pass through the primary cold water valve into a secondary cold water conduit connected to the hot water conduit, through the hot water port and terminating at the central chamber,
    wherein cold water passes through the cold water supply and manifold of the primary cold water path, through the secondary cold water valve into the secondary cold water conduit, into the hot water conduit, and through the hot water port into the mixing chamber, and out the mixed water outlet, and
    the thermostatic controller attached to a cylindrical shuttle, the shuttle capable of reciprocating motion within the central chamber, the shuttle having a cold water lip on its upper edge, the cold water lip capable of controlling flow through the primary cold water port into the mixing chamber, the shuttle having a hot water lip on its lower edge, the hot water lip capable of controlling flow through the hot water port into the mixing chamber.

4. A process of providing water from a thermostatic emergency eyewash and shower valve after failure of a hot water supply or failure of a wax motor or malfunction of a shuttle resulting in closure of a hot water port, the process comprising the steps:
    a. obtaining a thermostatic eyewash shower valve in which hot and cold water is mixed comprising: a hot water path from the hot water supply into a mixing chamber, the flow of hot water being through a check valve into a hot water conduit and through a hot water port controlled by a wax motor by means of a shuttle into a mixing chamber, a primary cold water path from a manifold attached to the cold water supply, the flow of cold water passing through a check valve which allows flow of cold water through a primary cold water conduit to a primary cold water port into the mixing chamber, the flow of cold water through the primary cold water port controlled by the wax motor by means of the shuttle, the shuttle capable of closing either but not both at the same time the hot water port and the primary cold water port, a secondary cold water path from the manifold attached to the cold water supply, the flow passing through a pressure-sensitive bypass valve into the hot water conduit and through the hot water port into the mixing chamber,
    b. closing the primary cold water port by the shuttle,
    c. allowing the pressure in the cold water manifold to exceed the pressure at which the pressure-sensitive bypass valve passes water,
    d. passing cold water through the secondary cold water valve and secondary cold water conduit into the hot water conduit, and
    e. passing cold water through the hot water port into the mixing chamber.

5. The process of claim 4 further comprising, between step d. and step e, the step of blocking the flow of hot water through the hot water conduit with the cold water.

6. The process of providing water from an emergency thermostatic eyewash and shower valve after failure of the cold water supply or failure of the wax motor or malfunction of the shuttle resulting in closure of the primary cold water port comprising the steps:
    a. obtaining a thermostatic eyewash shower valve in which hot and cold water is mixed comprising: a hot water path from the hot water supply into a mixing chamber, the flow of hot water being through a check valve into a hot water conduit and through a hot water port controlled by a wax motor by means of a shuttle into a mixing chamber, a primary cold water path from a manifold attached to the cold water supply, the flow passing through a check valve which allows flow of cold water through a primary cold water conduit through a primary cold water port into a mixing chamber, the flow of cold water through the primary cold water port controlled by the wax motor by means of the shuttle, the shuttle capable of closing either but not both at the same time the hot water port and the primary cold water port, a secondary cold water path from the manifold attached to the cold water supply, the flow of cold water passing through a pressure-sensitive bypass valve into the hot water conduit and through the hot water port into the mixing chamber, and b. allowing cold water to flow through the primary cold water path into the mixing chamber.

\* \* \* \* \*